Jan. 20, 1953 H. E. RENAUD 2,625,748
TEMPLET
Filed Nov. 3, 1947 2 SHEETS—SHEET 1
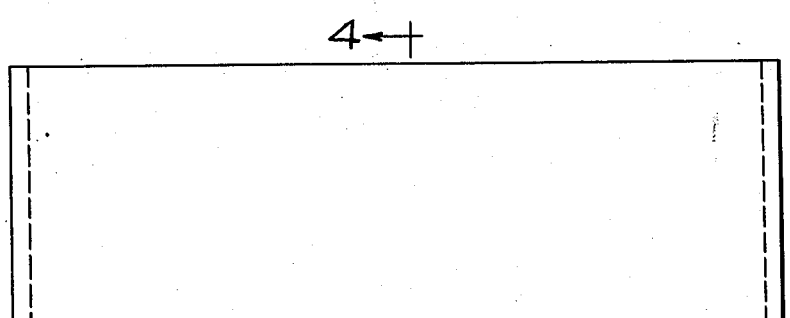
FIG. I.
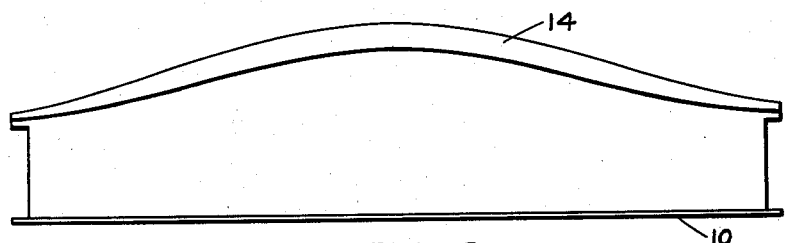
FIG. 2.
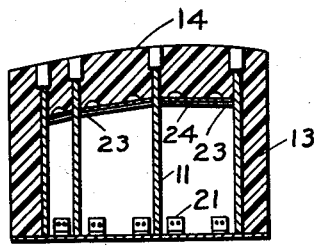
FIG. 4.
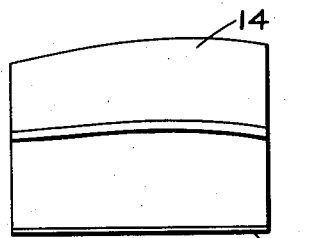
FIG. 3.
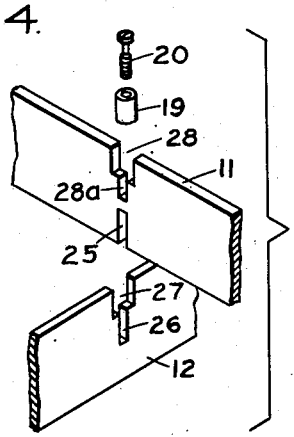
FIG. 9.
INVENTOR.
Harold E. Renaud
BY
Richard G. Parsons
ATTORNEY Jan. 20, 1953 H. E. RENAUD 2,625,748
TEMPLET
Filed Nov. 3, 1947 2 SHEETS—SHEET 2

INVENTOR.
Harold E. Renaud
BY
Richard G. Parsons
ATTORNEY

Patented Jan. 20, 1953

2,625,748

UNITED STATES PATENT OFFICE 2,625,748

TEMPLET

Harold E. Renaud, Lansing, Mich., assignor to Renaud Plastics, Inc., Lansing, Mich., a corporation of Michigan Application November 3, 1947, Serial No. 783,752

2 Claims. (Cl. 33—174)

This invention relates to templets and more particularly to three-dimensional templets normally used as models, checking fixtures and spotting racks for die forming in sheet metal work.

In describing the present invention and its relation to the overall procedure of manufacturing metal objects, the production of automobile bodies and parts thereof, will be used for illustrative purposes, although it will be understood that the invention is not limited to that field.

Early in the process of producing a new automobile body design it is customary to make to scale a solid clay or plaster model of the final body design. Lines are drawn on the model representing the lines of intersection of the body surfaces with vertical parallel planes and parallel horizontal planes passing through the body perpendicular to the longitudinal and vertical and transverse axes. These lines represent profiles of the body surface at various stations on the body.

The profiles are transferred directly, or enlarged to full scale, if taken from a reduced scale model, and transferred to a full scale draft of the body. It has then been customary to cut female templets conforming to the profiles on the draft, and using them to check with, construct a full size wooden model or mock-up of the completed body. The various dies, checking fixtures and model duplicates are constructed, using the wood model as a guide.

This procedure is laborious and time consuming, and always susceptible of error, because after the draft is drawn, female templets must be made, and solid blocks of wood sculptured to the final form with frequent application of the templets to the model to check the progress of the work.

The principal object of the present invention is to eliminate much of the labor and expense of the former process, and materially reduce the time elapsing between the production of the original scale model and the tooling for the manufacture of the bodies.

A further object is to provide a sturdy, inexpensive, and very accurate full size model or templet.

These objects are attained in part by providing reinforced templets of the various parts, each templet having a surface conforming to the shape of the finished article. The templets are fabricated from intersecting metal plates forming box shaped compartments between them into which non-metallic thermo-setting plastic of a dough-like or putty-like consistency is troweled or puddled. The edges of the plates adjoining the aforesaid surface conforming to the shape of the finished article are accurately cut to conform to the profiles on the draft and are assembled in proper relation so that when the plastic is placed in and around the framework and smoothed flush with the edges of the plates, an accurate representation of the finished article is obtained.

In forming the various plates to shape, the body draft is photographically reproduced on each plate. The plates are then accurately cut to conform to the various profiles on the draft. The plates are then assembled in spaced relation according to the spacing of the stations at which the profiles were taken.

After the framework is covered with plastic, the templet is cured, usually by heating in an oven. Slight imperfections and irregularities are eliminated by filling or sanding or both, and the completed templet is polished.

The templets of the various parts of the body are so constructed that they can be attached together on a base or buck to form a complete model of an automobile body so as to show in a concrete manner the overall configuration thereof. If the complete model is acceptable, the templets can be disassembled from the buck and used as models for the various parts of the body in the manufacture of dies, model duplicates, checking fixtures and spotting racks.

The invention is illustrated in the accompanying drawings, wherein:

Figure 1 is a plan view of a completed templet embodying the invention;

Figure 2 is a side elevational view thereof;

Figure 3 is an end elevational view of the templet;

Figure 4 is a cross-sectional view taken on substantially the line 4—4 of Figure 1;

Figure 9 is an exploded view of the parts shown in Figure 8.

Figure 5:
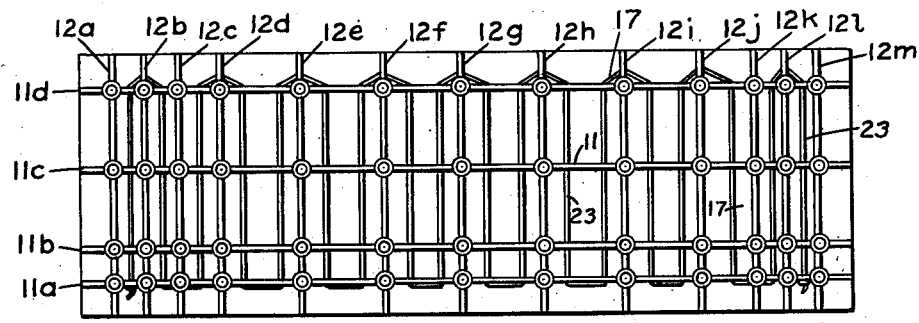
Figure 5 is a plan view of the grid-like framework for the templet.

The templet shown in Figures 1 to 3 comprises a base 10 to which is attached a plurality of intersecting metallic plates. The plates extending longitudinally of the templet are designated by the numeral 11 and subscripts a to d. The plates extending transversely of the templet are designated 12 with subscripts $a$ to $m$. The base 10 is preferably a metal plate. The intersecting plates 11 and 12 form a plurality of compartments 17 open at the ends remote from the base 10. At least a portion of each of the compartments between the plates 11 and 12 is filled with a synthetic resin 13 of the thermo-plastic type. The plastic is smoothed to the desired configuration of the completed templet, as will be more fully described hereafter. In the present completed templet the top surface 14 and side and end edges thereof conform to the desired predetermined shape of a sheet metal part of the manufactured article.

In forming the templet according to the present invention it is first necessary to construct a framework of the metallic plates 11 and 12. The plates 11 and 12 are cut from relatively heavy gauge sheet steel and attached to the base 10. The edges of each of the plates 11 and 12 which adjoin the surface having the desired predetermined curvature are cut to conform to that curvature. As is well known, it is the practice in designing a sheet metal part having a predetermined curvature to make a full scale draft thereof. This includes profile curves of the body taken at spaced apart parallel stations. The desired profile of each plate is transferred thereto by photographing the body draft and accurately cutting the plate to the desired profile on the draft. The plates are then assembled in the proper spaced relationship to each other so that the profiled edges of the plates conform to the final curved surface of the finished article. In the present drawings the curved edges of the plates 11 and 12 are designated by the numerals 15 and 16 and are located remote from the base.

Each plate 11 is provided with a plurality of rectangular notches 25 extending upwardly from the lower edge thereof and located at the zones of intersection with the plates 12. The width of each notch is the same as, or slightly greater than the thickness of the plates 12. The depth of each notch is approximately half of the width of the plate 11. Similar notches 26 are formed in the upper edges of the plates 12 so that the plates 11 and 12 can be fitted together in intersecting relation.

Figure 8:
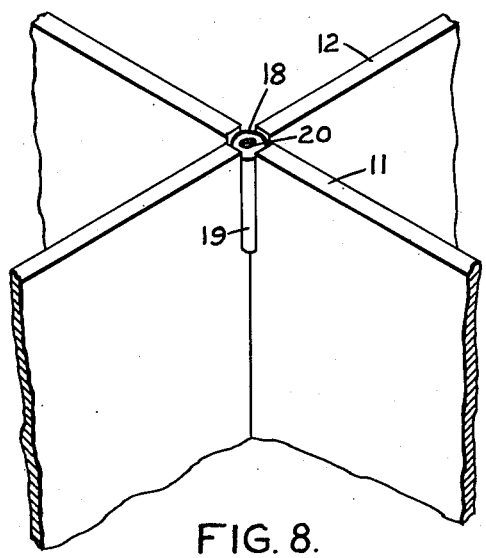
Figure 8 is a fragmentary isometric view illustrating the joint between two intersecting plates and the manner of locking the same together.

The notches 26 are widened at the upper ends thereof, to form recesses 27, while the upper edges of plates 11 are also recessed at 28. The dimensions of the recesses 27 and 28 are the same. Another notch 28a extends downwardly from the bottom of recess 28 for a short distance. Notch 28a is as wide as notch 26. The purpose of notch 28a will appear presently. When the plates 11 and 12 are assembled in overlapping intersecting relation, the recesses 27 and 28 form a cavity 18 (see Figure 8) to receive a cylindrical tube 19. The tube 19 is preferably slightly shorter than the depth of the cavity.

A self tapping screw 20 of uniform diameter is inserted into the tube 19 and driven into the notches 26 and 28a. The gauge of the screw 20 is such that the threads thereof will bite into opposite sides of notches 26 and 28a. The screw pulls the plates 11 and 12 and tube 19 into tight engagement, solidly holding the plates together.

The plates are attached to the base by means of angle brackets 21 riveted or screwed to the base 10 and to the respective plates 11 and 12. This results in a sturdy and rigid framework for the templet.

Figure 6:
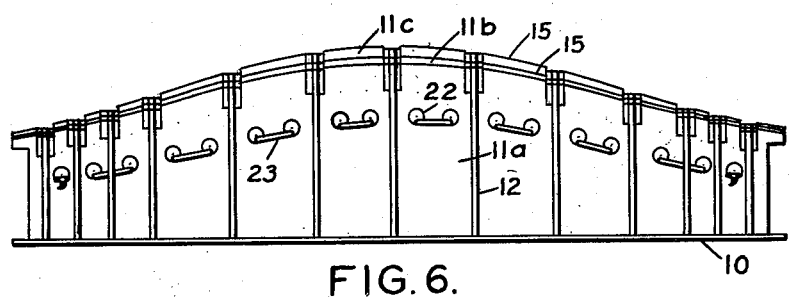
Figure 6 is a side elevational view thereof.
Figure 7:
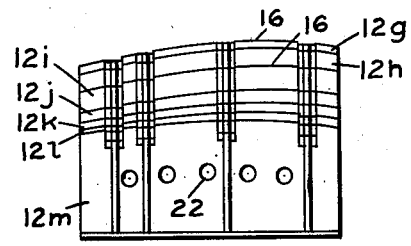
Figure 7 is an end elevational view of the framework.

It will be noted that each of the plates 11 and 12 is provided with apertures 22. These apertures are located in spaced relationship to the edges 15 and 16 of the plates 11 and 12. Preferably the apertures 22 are formed before the plates are assembled, as shown in Figures 5 to 7.

Suitable supports 23, which in the present instance are relatively heavy cord or wire, are threaded through the apertures 22 in the plates 11 and certain of the apertures in plates 12 and fastened therein. See Figures 4, 5 and 6. Partitions 24 are placed upon the supports 23. The partitions 24 may be cardboard or any other suitable relatively stiff material. The partitions are cut to fit snugly against the side walls of each of the compartments 17 and rest upon the supports 23.

Plastic material 13 of about the consistency of bread dough is troweled or puddled into the compartments 17 above the partitions 24. The plastic material is also troweled into the spaces formed at the sides of the templet and is carefully smoothed to conform to the exterior surfaces of the templet, as defined by the exposed edges of the plates 11 and 12. The templet is then placed in an oven and baked, during which time the plastic hardens and dries.

After the plastic has been cured, any slight imperfections or inaccuracies can be eliminated by sanding or filling with small amounts of fluid plastic and the model is then again baked.

From the foregoing it will be seen that the present invention provides a simple and economical templet which can be easily fabricated, with reference only to the original design drawings of the article which the templet is used to manufacture. The templet is relatively sturdy, yet relatively light in weight. The use of the partitions 24 decreases the cost of the finished templet, as well as its weight, by eliminating the need for a considerable quantity of plastic material. The plastic which normally would be required to fill the cavities below the partitions is not necessarily in the completed templet. It is relatively costly and heavy.

The provision of the openings 22 permits plastic to flow between the partitions 11 and 12, and when cured the plastic becomes rigidly interlocked with the framework of the templet.

It will be evident that the templet and the method of making the same disclosed herein can be utilized to make checking fixtures, model duplicates and spotting racks, as well as the first complete models of the article, if desired.

The scope of the invention is indicated in the appended claims.

I claim:

1. A three-dimensional templet having one surface conforming to a predetermined contour, said templet comprising a plurality of substantially parallel plates and a plurality of other substantially parallel plates intersecting said first named plates and interlocked therewith to form a plurality of box-shaped compartments, the planes of all of the plates extending substantially perpendicular to said surface, the edges of said plates adjoining said surface conforming to the contour thereof, one group of parallel plates having apertures therethrough in the zones between the plates of the other group and in relatively closely spaced relation to said last mentioned edges, supports extending through said apertures, partitions resting upon said supports and extending from wall to wall of said compartments, thermo-setting non-metallic plastic material filling said compartments between said partitions and the aforesaid edges, said plastic material being flush with the edges of said plates adjoining said surface.

2. A three-dimensional templet having one surface conforming to a predetermined contour, said templet comprising a plurality of substantially parallel plates and a plurality of other substantially parallel plates intersecting said first named plates and interlocked therewith to form a plurality of box-shaped compartments, the planes of all of the plates extending substantially perpendicular to all of said surface, the edges of said plates adjoining said surface conforming to the contour thereof, partitions in said compartments extending from wall to wall thereof in spaced relation to the edges of said plates, means supporting said partitions upon said plates, a thermo-setting non-metallic plastic material filling said compartments between said partitions and the edges of the plates conforming to said surface, said plastic material being flush with the edges of said plates adjoining said surface.

HAROLD E. RENAUD.

REFERENCES CITED

The following references are of record in the file of this patent:

UNITED STATES PATENTS

| Number | Name | Date |
|---|---|---|
| 1,090,211 | Hiatt | Mar. 17, 1914 |
| 1,171,818 | Walpole | Feb. 15, 1916 |
| 1,308,428 | Lachman | July 1, 1919 |
| 1,329,600 | Hewitt | Feb. 3, 1920 |
| 1,377,671 | Dicuemann | May 10, 1921 |
| 1,700,512 | Pedersen | Jan. 29, 1929 |
| 1,892,311 | MacDonald | Dec. 27, 1932 |
| 1,904,674 | Blumenthal | Apr. 18, 1933 |
| 1,985,341 | Fraser | Dec. 25, 1934 |
| 2,173,186 | Swartz | Sept. 19, 1939 |
| 2,202,683 | Baesgen | May 28, 1940 |
| 2,274,060 | Hart | Feb. 24, 1942 |
| 2,356,860 | Lewis | Aug. 29, 1944 |
| 2,420,359 | Dasher | May 13, 1947 |
| 2,434,372 | Stewart | Jan. 13, 1948 |
| 2,447,620 | Singleton | Aug. 24, 1948 |